United States Patent
Corby et al.

(10) Patent No.: US 6,418,417 B1
(45) Date of Patent: Jul. 9, 2002

(54) SYSTEM, METHOD, AND COMPUTER PROGRAM PRODUCT FOR VALUATING WEATHER-BASED FINANCIAL INSTRUMENTS

(75) Inventors: Paul M. Corby, Malvern; Frederic D. Fox, Wayne, both of PA (US)

(73) Assignee: Strategic Weather Services, Wayne, PA (US)

( * ) Notice: Subject to any disclaimer, the term of this patent is extended or adjusted under 35 U.S.C. 154(b) by 0 days.

(21) Appl. No.: 09/168,276

(22) Filed: Oct. 8, 1998

(51) Int. Cl.$^7$ .............................................. G06F 17/60
(52) U.S. Cl. .............................. 705/35; 705/36; 705/37
(58) Field of Search .............................. 705/35, 36, 37

(56) References Cited

U.S. PATENT DOCUMENTS 4,040,629 A * 8/1977 Kelly ........................... 273/278
6,021,402 A * 2/2000 Takriti ......................... 705/412

OTHER PUBLICATIONS

Hunter, R., "Forecast for Weather Derivatives: Hot Derivatives Strategy", May 1999, pp. 1–6, XP002133864, as printed from http://derivatives.com/magazine/arrive/1998/0598feal.asp> p. 1, Line 1—p. 6, line 9.

Studwell, A. "Weather Derivatives" 11$^{th}$ Conference on Applied Climatology, Jan. 10–15, 1999, pp. 36–40, XP00089822, p. 36, col. 1, line 1–p. 40, col. 1, line 33.

Turvay, C. G., "Weather Derivatives and Specific Event Risk", Aug., 1999, pp. 1–11, XP002133865, as printed from http://agecon.lib.umn.edu/aaea99/sp99/sp99/tu02.pdf>, p. 2, line 1, p. 8, line 2.

Banham, R., "Reinsurers Seek Relief in Computer Predictions", Aug. 1993, pp. 14–16, 18–19, XP002082269, p. 14, col. 1, line 1, col. 2, line 29.

Malliaris, M., "Beating the Best: A Neutral Network Challenges the Black–Scholes Formula", Proceedings of the Conference on Artificial Intelligence for Applications, US, Los Alamitos, IEEE Comp. Soc. Press, 1993, pp. 445–449, XP000379639, ISBN; 0–8186–3840–0, p. 445, col., 1, line 16, p. 446, col. 1, line 17.

Copy of International Search Report from PCT Appl. No. PCT/US99/23452, 5 pages, mailed Jun. 4, 2000.

Stix, G., "A Calculus of Risk", Scientific American, May 1998, pp. 92–97.

Upbin, B., "Betting against God.", Forbes, Jul. 6, 1998, v162, n1, p. 108(1).

"Origins of Option Pricing Techniques", "The Black and Scholes Model", "The Black and Scholes Model" and "Graphs of the Black Scholes Model", as printed from http://bradley.bradley.edu/~arr/bsm, Apr. 9, 1997, (8 pages).

Lucchetti, Aaron; Cold Winter On the Way? Some bet on it, Wall Street Journal; Nov. 6, 1997.*

Schwartz, Susana; Modeling tools aid in finacial risk management, Insurance & Technology; Apr. 1996, vol. 21, Iss 4, pp 20–21.*

Mary G Gotschall; Bullish on weather; Electric Perspectives, Washington; Sep./Oct. 1998; vol. 23, Iss. 5; p. 30, 8 pgs.*

* cited by examiner

Primary Examiner—V. Miller
Assistant Examiner—Jagdish N Patel
(74) Attorney, Agent, or Firm—Sterne, Kessler, Goldstein & Fox P.L.L.C.

(57) ABSTRACT

A system and method for valuating weather-based financial instruments including weather futures, options, swaps, and the like. The system includes weather forecast, weather history, and financial databases. Also included in the system is a central processing trading server that is accessible via a plurality of internal and external workstations. The workstations provide a graphical user interface for users to enter a series of inputs and receive information (i.e., output) concerning a financial instrument. The method involves collecting the series of inputs—start date, maturity date, geographic location(s), risk-free rate, and base weather condition—affecting the value of the financial instrument and applying a pricing model modified to account for weather.

16 Claims, 6 Drawing Sheets

WEATHER HISTORY 108

| YEAR | MA | DATA TYPE | P1 | P2 | P3 | P4 | P5 | P6 |
|------|------|-----------|------|------|------|------|------|------|
| 1994 | MSA 100 | TEMP. SEA | 46 | 47 | 50 | 51 | 54 | 55 |
| 1995 | MSA 100 | TEMP. SEA | 46 | 47 | 49 | 51 | 53 | 55 |
| 1994 | MSA 100 | SNOW. SEA | 0.7 | 0.2 | 0.2 | 0.1 | 0 | 0.1 |
| 1995 | MSA 100 | SNOW. SEA | 0.8 | 0.2 | 0.2 | 0.1 | 0 | 0 |
| 1994 | MSA 100 | PREC. SEA | 1.01 | 1.03 | 1.08 | 1.1 | 1.12 | 1.1 |
| 1995 | MSA 100 | PREC. SEA | 1.01 | 1.03 | 1.07 | 1.1 | 1.12 | 1.1 |
| 1994 | MSA 100 | SNOW | 0 | 0 | 0 | 0 | 1.2 | 0 |
| 1995 | MSA 100 | SNOW | 0 | 0 | 0 | 0 | 0 | 0 |
| 1994 | MSA 100 | PREC | 1.5 | 0.4 | 0.9 | 1.3 | 1.7 | 0.3 |
| 1995 | MSA 100 | PREC | 1.1 | 0.01 | 2.68 | 1.78 | 0.48 | 0.01 |
| 1994 | MSA 100 | TEMP | 49 | 43 | 45 | 47 | 50 | 42 |
| 1995 | MSA 100 | TEMP | 53 | 51 | 56 | 50 | 58 | 54 |
| 1994 | MSA 100 | TEMP. CAT | 1 | -1 | -1 | -1 | -1 | -1 |
| 1995 | MSA 100 | TEMP. CAT | 1 | -1 | -1 | 0 | 1 | -1 |
| 1994 | MSA 100 | PREC. CAT | 1 | -1 | -1 | -1 | -1 | -1 |
| 1995 | MSA 100 | PREC. CAT | 1 | -1 | -1 | 1 | -1 | -1 |

| YEAR | MA | DATA TYPE | P1 | P2 | P3 | P4 | P5 | P6 |
|---|---|---|---|---|---|---|---|---|
| N+1 | MSA 100 | SNOW | 0.9 | 0.4 | 0.3 | 0.2 | 0 | 0 |
| N+1 | MSA 100 | PREC | 1.1 | 1.05 | 1.05 | 1.00 | 1.15 | 1.2 |
| N+1 | MSA 100 | TEMP | 48 | 49 | 50 | 53 | 55 | 57 |
| N+1 | MSA 100 | TEMP. CAT | −1 | −1 | −1 | −1 | −1 | −1 |
| N+1 | MSA 100 | PREC. CAT | −1 | −1 | −1 | −1 | −1 | −1 |
| N+1 | MSA 100 | SNOW. CAT | −1 | 0 | 0 | 0 | 0 | 0 |
| N+1 | MSA 100 | PREC. SEA | 0.8 | 0.4 | 0.3 | 0.1 | 0 | 0 |
| N+1 | MSA 100 | TEMP. SEA | 1.00 | 1.03 | 1.06 | 1.05 | 1.10 | 1.1 |
| N+1 | MSA 100 | | 47 | 47 | 49 | 52 | 54 | 55 |

WEATHER FORECAST DATA 106

SYSTEM, METHOD, AND COMPUTER PROGRAM PRODUCT FOR VALUATING WEATHER-BASED FINANCIAL INSTRUMENTS

CROSS-REFERENCE TO OTHER APPLICATIONS

The following applications of common assignee are related to the present application:

"System and Method for the Advanced Prediction of Weather Impact on Managerial Planning Applications," Ser. No. 08/002,847, filed Jan. 15, 1993, now U.S. Pat. No. 5,521,813, incorporated herein by reference in its entirety.

"A User Interface For Graphically Displaying the Impact of Weather on Managerial Planning," Ser. No.08/504,952, filed Jul. 20, 1995, now allowed, incorporated herein by reference in its entirety.

"System and Method for Determining the Impact of Weather and Other Factors on Managerial Planning Applications," Ser. No.08/205,494, filed Mar. 4, 1994, now U.S. Pat. No. 5,491,629, incorporated herein by reference in its entirety.

"System and Method for Weather Adapted, Business Performance Forecasting," Ser. No. 08/588,248, filed Jan. 18, 1996, now allowed, incorporated herein by reference in its entirety.

BACKGROUND OF THE INVENTION

1. Field of the Invention

The present invention relates generally to financial trading systems and more particularly to the processing, valuating, and trading of weather-based financial instruments such as derivatives and the like.

2. Related Art

In today's financial markets, the use of financial instruments known as "derivatives" have exponentially grown and is now common place. A derivative is an investment vehicle whose value is based on the value of another security or underlying asset. That is, a derivative is essentially a financial instrument that is derived from the future movement of something that cannot be predicted with certainty. By the late 1990's the Office of the Comptroller of the Currency estimates that commercial banks in the United States alone, held over twenty trillion dollars worth of derivative-based assets. Common examples of derivatives include futures contracts, forward contracts, options, and swaps, all of which are briefly explained below.

Forward and futures contracts are standardized, transferable agreements, which may be exchange-traded, to buy or sell a commodity (e.g., a particular crop, livestock, oil, gas, etc.). These contracts typically involve an agreed-upon place and time in the future between two parties.

Options contracts are agreements, that may be exchange-traded, among two parties that represent the right to buy or sell a specified amount of an underlying security (e.g., a stock, bond, futures contract, etc.) at a specified price within a specified time. The parties of options contracts are purchasers who acquire "rights," and sellers who assume "obligations." Further, a "call" option contract is one giving the owner the right to buy, whereas a "put" option contract is one giving the owner the right to sell the underlying security. There is typically an up-front, non-refundable premium that the buyer pays the seller to obtain the option rights.

Swaps allow entities to exchange variable cash flows for fixed payments. They are similar to options but no premium (i.e., up-front money) is paid to obtain the rights. It is essentially an outright trade based on the expected movement of the price of the derivative's underlying commodity.

Derivatives are typically used by institutional investors to increase overall portfolio return or to hedge or revoke portfolio risks. Derivatives are also frequently used by banks, companies, organizations, and the like to protect against market risks in general. For example, utility companies may be interested in protecting against meeting heating or cooling demands when unexpected weather occurs, and banks may be interested in protecting against the risk of loan defaults. Derivatives help in managing risks by allowing such banks, companies, organizations, and the like to divide their risk into several pieces that may be passed off to other entities who are willing to shoulder the risk for an up-front fee or future payment stream.

Derivatives, being financial instruments, may be traded among investors as are stocks, bonds, and the like. Thus, in order to trade derivatives, there must be a mechanism to price them so that traders may exchange them in an open market.

The relationship between the value of a derivative and the underlying asset are not linear and can be very complex. Economists have developed pricing models in order to valuate certain types of derivatives. As is well known in the relevant art(s), the Black-Scholes option pricing model is the most influential and extensively used pricing model. The Black-Scholes model is based on stochastic calculus and is described in detail in a variety of publicly available documents, such as Chriss, Neil A., The Black-Scholes and Beyond Interactive Toolkit: A Step-by-Step Guide to In-depth Option Pricing Models, McGraw-Hill, 1997, ISBN: 078631026X (USA), which is incorporated herein by reference in its entirety.

Whether using the Black-Scholes or any other pricing model, each has inherent flaws and thus poses risks. It has been estimated that some 40% of losses in dealing with derivatives can be traced to problems related to pricing models.

Risks in relying on any model includes errors in the model's underlying assumptions, errors in calculation when using the model, and failure to account for variables (i.e., occurrences) that may affect the underlying assets. When considering the latter risk—failure to account for occurrences that may affect price—weather is one occurrence which has been historically been overlooked. That is, weather, and more specifically future weather, has not been included as a formal variable in pricing models.

The few models that have considered weather usually have only considered past (i.e., historical) weather data. That is, most models assume, for example, that the previous year's weather and its effects on businesses, etc. will repeat from year to year. Historical analysis has shown, however, that this assumption is true only 25% of the time. Thus, regardless of the commodity, risk management trading techniques or vehicles, traders essentially have been operating in the "blind" without knowledge of future weather conditions.

SUMMARY OF THE INVENTION

The present invention is a system, method, and computer program product for valuating (and thus, processing and trading) weather-based financial instruments and/or financial instruments that are impacted in some manner by weather. The method preferably involves specifying a start date and maturity date for the financial instrument, and selecting at least one geographic region to be covered by the financial instrument. Then, at least one weather condition (e.g., precipitation, HDDs, CDDs, etc.) that the financial instruments will derive its value from or is related to (or impacted by) is selected. A financial database may then be accessed so that a risk-free rate can be specified. A weather history database is then accessed to obtain historic weather information for the geographic location during the period between the start date and the maturity date. A weather forecast database is also accessed to obtain future weather information for the geographic location during the period between the start date and the maturity date. A pricing model can then be applied to obtain a value for the weather-based financial instrument using the historical weather information, the future weather information, and the risk-free rate.

The system for valuating a weather-based financial instrument of the present invention includes a weather history database that stores historical weather information for at least one geographic location and a weather forecast database that stores future weather information for the geographic location. The system may also include a financial database that stores information in order to calculate a risk-free rate. In order to access the databases and valuate financial instruments, a trading server is included within the system. The trading server provides the central processing of the system by applying a pricing model, and is responsive to a plurality of internal and external workstations that allow users, via a graphical user interface, to access the trading system.

One advantage of the present invention is that all futures, options, swaps, and other derivative financial instruments can more easily and confidently be priced when accounting for future weather.

Another advantage of the present invention is that information and data sets can be provided that enable traders to identify and capitalize on weather-driven market fluctuations.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

TABLE OF CONTENTS

I. Overview
  A. Weather Derivatives
  B. Present Invention

II. System Architecture
  A. System Architecture Overview
  B. Weather History Database
  C. Weather Forecast Database
  D. Relationship Between Past and Future Databases
  E. Time Periods
  F. Financial Database III. The Black-Scholes Pricing Model IV. General System Operation
  A. Inputs
  B. Processing and Output V. Detailed Example of System Operation VI. Environment VII. Conclusion

I. Overview

A. Overview of Weather Derivatives

Recently, with speculation on the effects of global warming and such events as El Niño, a new type of derivative has emerged—a weather derivative. A weather derivative is a contract whose value is based on the fluctuations in temperature or the accumulation of a type of precipitation (e.g., drizzle, rain, showers, snowfall, hail, etc.). Weather derivatives may be utilized, for example, by farmers as a hedge against failed crops or by insurance companies to hedge against future claims by policy holders. Unlike insurance policies, however, the entity purchasing a weather derivative contract does not have to prove any actual loss. The purchaser of an options-type weather derivative, for example, would only need to show that the measure of weather conditions called for in the contract went above or below the specified "strike" point (i.e., a numerical value that triggers payment). In contrast, the other party to the contract (i.e., the seller) would be expecting that the measure of weather conditions called for in the contract is not going to go above or below the specified strike point.

Weather derivative contracts are typically based on the concept of "cooling degree-days" (when speaking of summer months) or "heating degree-days" (when speaking of winter months), as the measure of weather conditions. There are various expressions for characterizing CDDs and HDDs. For example, and without limitation, a "cooling degree-day" is each number of degrees above 65 degrees Fahrenheit (65° F.) the mean measured temperature for a given day reaches. For example, and without limitation, a "heating degree-day" is each number of degrees below 65° F. the mean measured temperature for a given day reaches. The temperature of 65° F. is used as a benchmark because, in the energy industry, it is thought that at that temperature, no heating or air conditioning is used by consumers. For example, if a day in August reaches a high temperature of 90° F. and a low temperature of 70° F., then the mean temperature for that day is 80° F. and thus it is a 15 cooling degree-day. However, other values can be used for the benchmark. Also, other expressions can be used to quantify CDDs and HDDs.

Thus, for a month, the number of "cooling degree-days" (CDDs) is the sum of the each day's cooling degree-day within that particular month. This sum is preferably expressed in equation (1):

$$\text{Month's cooling degree-days} = \sum_{i=1}^{30} t_i - 65° \text{ F.} \qquad (1)$$

Equation (1) takes the summation of the difference between 65° F. and mean temperature t of each day i. As will be apparent, equation (1) will include 30 days for months such as April, June, etc., and 31 days for months such as May, July, August, etc. Furthermore, should the temperature for any day i fall to 65° F. or below, $t_i$ is set to zero (0) for that day.

Conversely, the number of "heating degree-days" (HDDs) is the sum of the each day's heating degree-day within that particular month. This sum is preferably expressed in equation (2):

$$\text{Month's heating degree-days} = \sum_{i=1}^{30} 65° \text{ F.} - t_i \qquad (2)$$

Equation (2) takes the summation of the difference between the mean temperature t of each day i and 65° F. As will be apparent, equation (2) will include 30 days for months such as September, November, etc., 31 days for months such as January, March, etc., and 28 or 29 days for February. Furthermore, should the temperature for any day i rise to 65° F. or above, $t_i$ is set to zero (0) for that day.

Given that a month's cooling degree-days and heating degree-days have been defined (in the above examples), a typical weather derivative contract may now be explained. Two parties may enter into a swap contract where party B agrees to pay party A the sum of $5000 for every cooling degree-day above a "float" value. The float value represents party A's speculation regarding a month's cooling degree-days. In return party A agrees to pay party B $5000 for every cooling degree-day below a "fix" value. The float value represents party A's speculation regarding a month's cooling degree-days. Furthermore, the parties may agree on a "cap" which expresses the parties' maximum dollar liability. A weather derivative (i.e., swap) contract such as this is detailed in Table 1.

TABLE 1

EXAMPLE OF WEATHER DERIVATIVE (I.E., SWAP) CONTRACT

December 1997, Parties Agree on the following terms:
$5000/CDD for August 1998 for a particular geographic region
Cap = $1,000,000
Float = 625
Fix = 650
September 1998, Parties Calculate:

$$\text{CDDs for August 1998} = \sum_{i=1}^{31} t_i - 65$$

| | |
|---|---|
| if CDDs > 650: | A receives {$5000 × (CDDs − 650)} |
| if CDDs < 625: | B receives {$5000 × (625 − CDDs)} |
| if 625 < CDDs < 650: | The parties exchange no money |
| Example Numbers: | |
| if CDDs = 775: | Party A receives $750,000 from Party B |
| if CDDs = 600: | Party B receives $125,000 from Party A |

As will be apparent to one skilled in the relevant art(s), other scenarios are possible. For example, party A may pay an up-front cost (e.g., $100,000) to enter into an options contract. Thus, in such a scenario, if the CDDs are below a strike value, A loses the up-front payment but pays nothing else.

It should be noted that for such weather derivative contracts to operate in an open market, parties have to agree on the recorded weather conditions (e.g., temperature or precipitation) for each day within the contract period. Therefore, organizations or government entities, such as the National Oceanic and Atmospheric Administration (NOAA) for example, serve as record keepers for each days' official temperature (or precipitation) to avoid legal disputes.

Furthermore, it will be apparent to one skilled in the relevant art(s) the parties may agree on a different definition of cooling-degree days and/or heating-degree days. Thus, equations (1) and (2) would be modified accordingly.

Derivatives, being financial instruments, may be traded among investors as are stocks, bonds, and the like. Thus, in order to trade derivatives, there must be a mechanism to price them so that traders may exchange them in an open market. To date, there is no organized exchange for weather derivatives as they are traded as over-the-counter (OTC) instruments.

The relationship between the value of a derivative and the underlying asset are not linear and can be very complex. Economists have developed pricing models in order to valuate certain types of derivatives. As is well known in the relevant art(s), the Black-Scholes option pricing model is the most influential and extensively used pricing model. The Black-Scholes model is based on stochastic calculus and is described in detail in a variety of publicly available documents, such as Chriss, Neil A., The Black-Scholes and Beyond Interactive Toolkit: A Step-by-Step Guide to In-depth Option Pricing Models, McGraw-Hill, 1997, ISBN: 078631026X (USA), which is incorporated herein by reference in its entirety.

Whether using the Black-Scholes or any other pricing model, each has inherent flaws and thus poses risks. It has been estimated that some 40% of losses in dealing with derivatives can be traced to problems related to pricing models.

Risks in relying on any model includes errors in the model's underlying assumptions, errors in calculation when using the model, and failure to account for variables (i.e., occurrences) that may affect the underlying assets. When considering the latter risk—failure to account for occurrences that may affect price—weather is one occurrence which has been historically been overlooked. That is, weather, and more specifically future weather, has not been included as a formal variable in pricing models.

The few models that have considered weather usually have only considered past (i.e., historical) weather data. That is, most models assume, for example, that the previous year's weather and its effects on businesses, etc. will repeat from year to year. Historical analysis has shown, however, that this assumption is true only 25% of the time. Thus, regardless of the commodity, risk management trading techniques or vehicles, traders essentially have been operating in the "blind" without knowledge of future weather conditions.

Therefore, given the fact that weather (especially future weather) has been overlooked in pricing modes, existing models that have considered past weather are not developed fully, and also considering the newly developed weather derivative financial instrument, what is needed is a mechanism to price weather derivatives so that parties may exchange them in an open market. What is also needed is a system to rationally and intelligently derive fix and float values as well as the dollar values per CDD as shown in Table 1.

B. Overview of The Present Invention

The present invention is directed to a system, method, and computer program product for valuating (and thus, processing and trading) weather-based financial instruments, and/or financial instruments that are affected by weather. In an embodiment of the present invention, a weather trading organization may provide a brokerage desk that facilitates weather derivative trades for clients as well as providing an interactive World-Wide Web site accessible via the global Internet for a future weather index, pricing model, and trade execution services. The weather trading organization may also provide information and data sets that enable traders to identify and capitalize on weather driven market fluctuations. Such an infrastructure may be an organized exchange for weather derivatives.

Such a system could also allow industries such as travel, ski resorts, theme parks, agriculture, airlines, or any other weather-affected industry to intelligently trade and use weather derivatives not only to hedge against weather-related market risks, but also to speculate for profit.

The present invention is described in terms of the above example. This is for convenience only and is not intended to limit the application of the present invention. In fact, after reading the following description, it will be apparent to one skilled in the relevant art how to implement the following invention in alternative embodiments. For example, and without limitation, the present invention would also benefit utilities, power marketers, fuel traders, power traders, fuel emissions credit traders, investment banks, insurance and re-insurance, capital market traders, commodity traders, and over-the-counter (OTC) traders (i.e., anyone whose "bottom-line" is affected by weather).

II. System Architecture

A. System Architecture Overview

Figure 1:
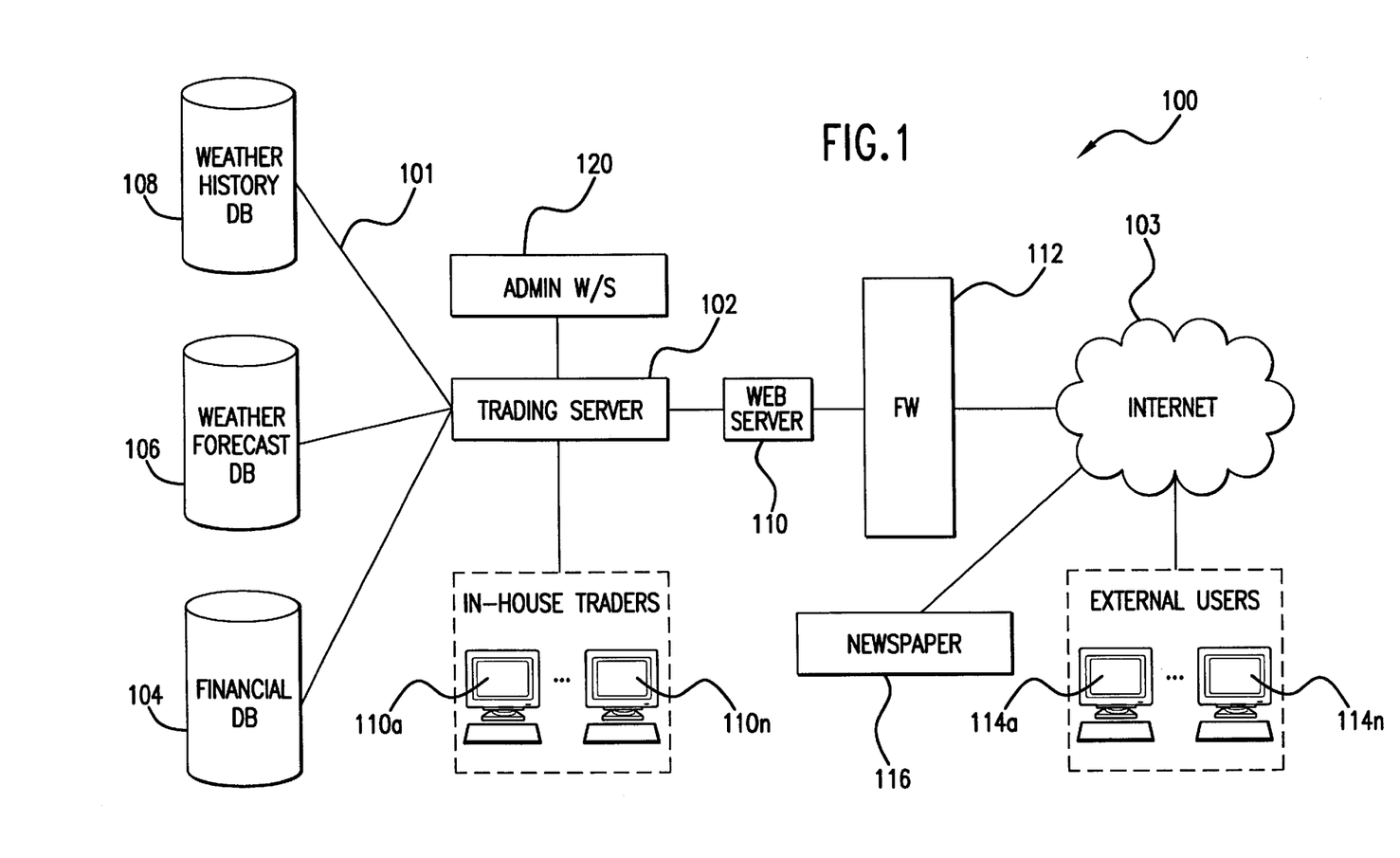
FIG. 1 is a block diagram representing the system architecture of an embodiment of the present invention.

Referring to FIG. 1, a weather trading system 100, according to an embodiment of the present invention, is shown. It should be understood that the particular trading system 100 in FIG. 1 is shown for illustrative purposes only and does not limit the invention. Other implementations for performing the functions described herein will be apparent to persons skilled in the relevant art(s) based on the teachings contained herein, and the invention is directed to such other implementations. As will be apparent to one skilled in the relevant art(s), all of components "inside" of the trading system 100 are connected and communicate via a communication medium such as a local area network (LAN) 101.

The trading system 100 includes a trading server 102 that serves as the "back-end" (i.e., weather processing system) of the present invention. Connected to the trading server 102, is a financial database 104, a weather history database 108, and a weather forecast database 106. The trading server 102 is also connected to a Web server 110. As is well-known in the relevant art(s), a Web server is a server process running at a Web site which sends out web pages in response to Hypertext Transfer Protocol (HTTP) requests from remote browsers. The Web server 110 serves as the "front end" of the present invention. That is, the Web server 110 provides the graphical user interface (GUI) to users of the trading system 100 in the form of Web pages. Such users may access the Web server 110 at the weather trading organization's site via a plurality of internal workstations 110 (shown as workstations 110a–n).

A firewall 112 (shown as "FW" 112) serves as the connection and separation between the LAN 101, which includes the plurality of network elements (i.e., elements 102–110 and 120) "inside" of the LAN 101, and the global Internet 103 "outside" of the LAN 101. Generally speaking, a firewall—which is well-known in the relevant art(s)—is a dedicated gateway machine with special security precaution software. It is typically used, for example, to service Internet 103 connections and dial-in lines, and protects a cluster of more loosely administered machines hidden behind it from an external invasion.

The global Internet 103, outside of the LAN 101, includes a plurality of external workstations 114 (shown as workstations 114a–n). The external workstations 118 allow client-users (traders) of the weather trading organization to remotely access and use the trading system 100.

The trading system 100 includes an administrative workstation 120 that may be used by the trading organization to update, maintain, monitor, and log statistics related to the server 102 and the trading system 100 in general. Furthermore, FIG. 1 depicts a newspaper 116 connected to the Internet 103. This is to signify that newspapers 116 or other information distribution entities may access trading system 100 in order to publish the trading organization's future weather index according to an embodiment of the present invention.

While one trading server computer 102 is shown in FIG. 1, it will be apparent to one skilled in the relevant art(s) that trading system 100 may be run in a distributed fashion over a plurality of the above-mentioned network elements connected via LAN 101. Similarly, while several databases (i.e., 104, 106, and 108) are shown in FIG. 1, it will be apparent to one skilled in the relevant art(s) that trading system 100 may utilize databases physically located on one or more computers which may or may not be the same as sever 102. More detailed descriptions of the trading system 100 components, as well as their functionality, are provided below.

B. Weather History Database

Figure 2:
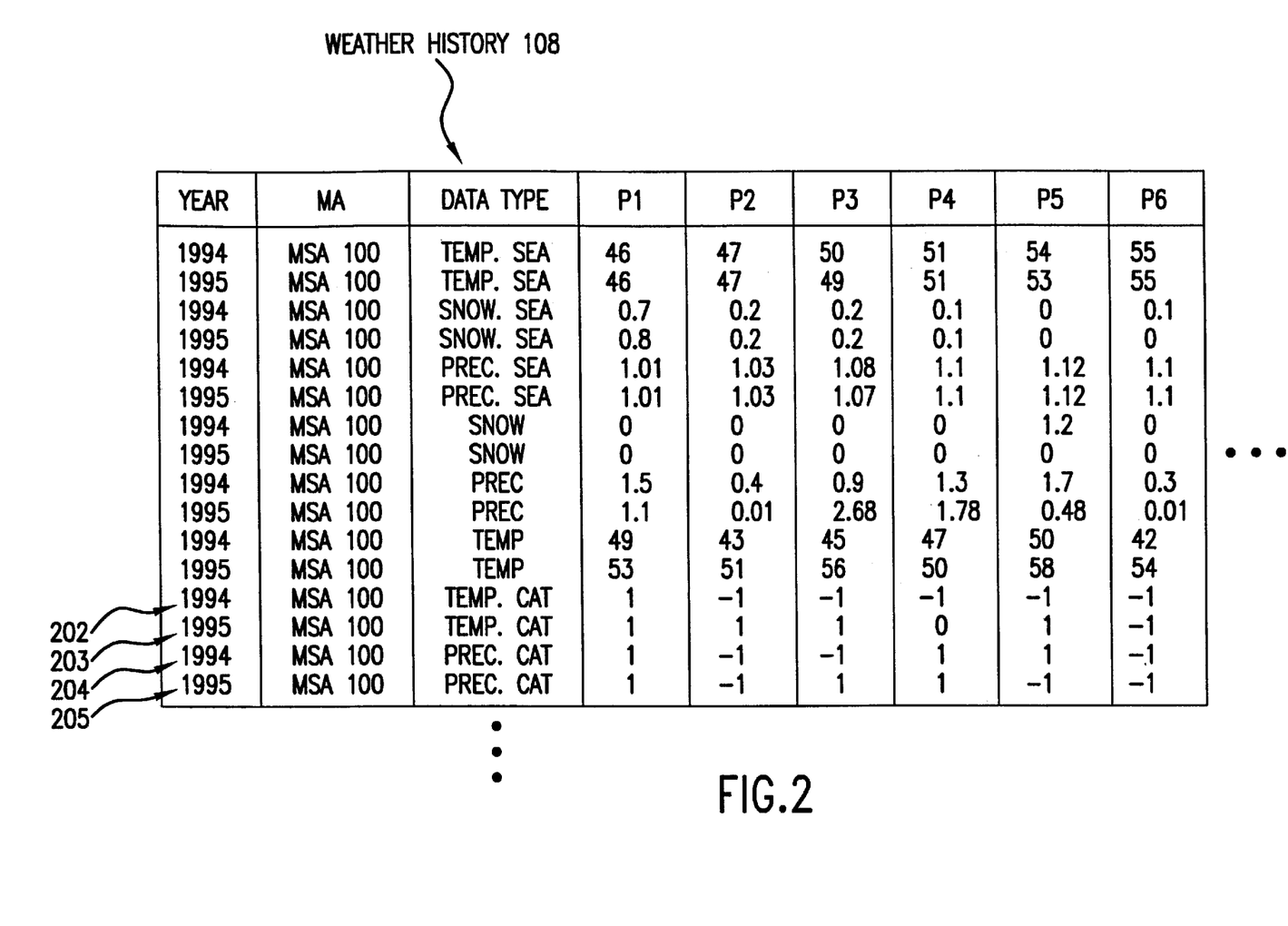
FIG. 2 depicts a preferred weather history database used by the present invention.

An example weather history database 108 is shown in FIG. 2. The weather history database 108 is described in detail in a commonly-owned, U.S. patent application No. 08/588,248, filed Jan. 18, 1996 entitled, "System and Method for Weather Adapted, Business Performance Forecasting," now allowed and incorporated herein by reference in its entirety. For completeness, however, the weather history database 108 is briefly described herein. The weather history database 108 includes, for each year in the view, one or more records for each metropolitan area (MA). (The term MA closely resembles the well known name Metropolitan Statistical Area (MSA). However MA encompasses a larger surrounding geographical area/region than the strict MSA definition.) (However, since MA and MSA are similar, they are used interchangeably herein.) The weather history database 108 contains but is not limited to data on metropolitan areas. These records contain information specifying the weather that occurred in the subject MA in the time span represented in the view. Specifically, for each MA, there is a record for each of several weather data types.

In an embodiment of the present invention, there are three classes of weather data types in the weather history database 108—seasonal, actual, and category (also called weather pattern). A seasonal data type is the seasonal (or average) value of a weather parameter. Accordingly, the data type "temp.sea" is the average temperature. The data type "snow.sea" is the average snowfall. The data type "prec.sea" is the average precipitation.

An actual data type is the actual value of a weather parameter. Accordingly, the data type "temp" is the actual temperature. The data type "snow" is the actual snowfall. The data type "prec" is the actual precipitation.

A category data type reflects a weather parameter's actual versus seasonal values. Accordingly, the data type "temp.cat" reflects actual temperature versus seasonal temperature. The data type "prec.cat" reflects actual precipitation versus seasonal precipitation. If a category data type is equal to 1, then the actual value was greater than the seasonal value. If a category data type is equal to 0, then the actual value was equal to (or substantially corresponded to) the seasonal value. If a category data type is equal to −1, then the actual value was less than the seasonal value. Of course, values other than 1, 0, and −1 could be alternatively used to indicate these relationships. Also, other weather data types may be used.

The historical weather information in the weather history database 108 is provided on a per period basis. As indicated above, the period may be any increment of time, such as daily, weekly, bi-weekly, monthly, bimonthly, quarterly, etc. Preferably, the increment of time represented by a period is the same in both of the weather databases (106 and 108) within trading system 100.

Each weather pattern includes one or more weather parameters. For example, the temperature/precipitation weather pattern includes the temperature parameter and the precipitation parameter. For any given period, each parameter can be either seasonal, below seasonal, or above seasonal (except the sustained weather pattern, described above). For any given period, the values of these weather patterns are represented by the entries in the weather history database 108 having the category data type. For example, in 1994, the weather pattern in MSA100 during period P1 was temperature above seasonal/precipitation above seasonal (see records 202 and 204 in FIG. 2). This weather pattern is abbreviated by T1P1. This file is used as the "look up" to allow the system to determine which patterns it will use. Consider, for example, records 202–205 in the weather history database 108 shown in FIG. 2. In period P1, the weather pattern T1P1 occurred in both 1994 and 1995.

C. Weather Forecast Database

Figure 3:
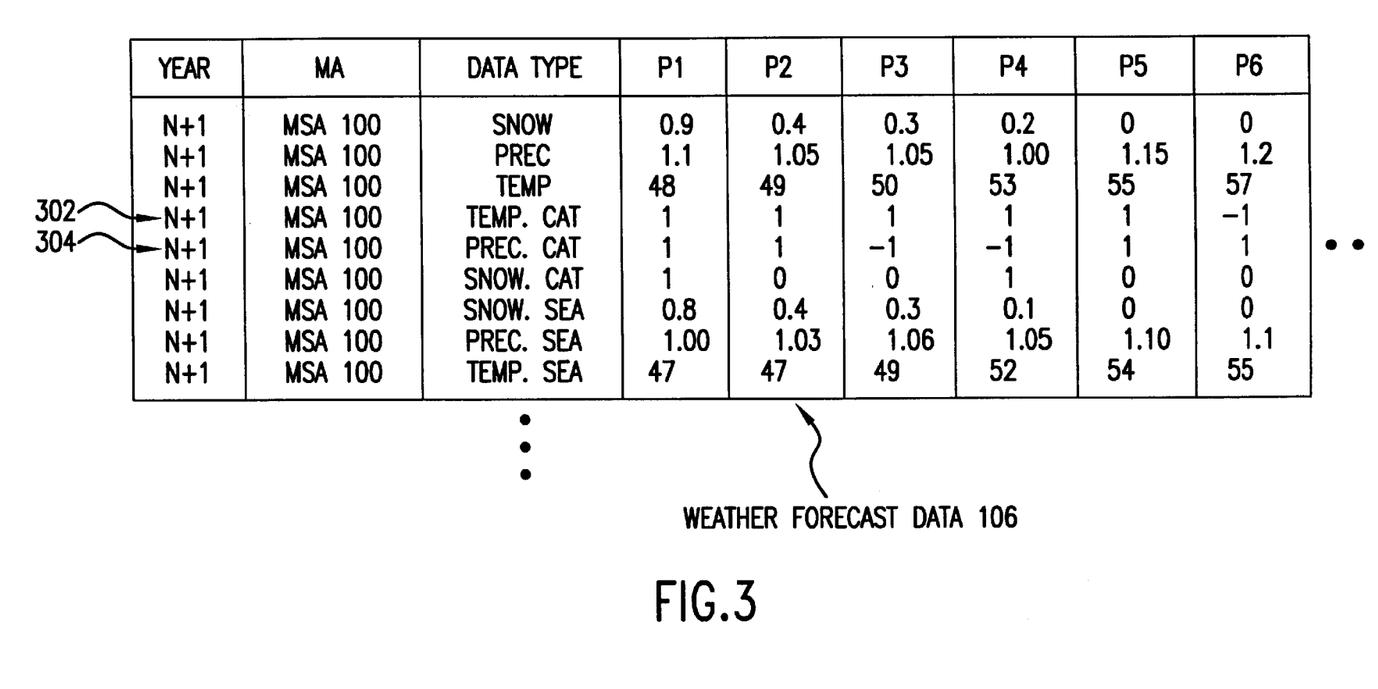
FIG. 3 depicts a preferred weather forecast database used by the present invention.

An example weather forecast database 106 is shown in FIG. 3. The weather forecast database 106 is described in detail in the commonly-owned, U.S. patent application No. 08/588,248, filed Jan. 18, 1996 entitled, "System and Method for Weather Adapted, Business Performance Forecasting," now allowed and incorporated herein by reference in its entirety. For completeness, however, the weather forecast database 106 is briefly described herein. The weather forecast database 106 includes, for each future year in the view, one or more records for each MA. These records contain information specifying the weather that is predicted to occur in the subject MA in the future time span represented in the view. Specifically, for each MA, there is a record for each of several weather data types.

There are also three classes of weather data types, as in the weather history database 108, are seasonal, actual, and category. These categories are the same as those described above with respect to the weather history database 108. Accordingly, the description above of the weather history database 108 also applies to the weather forecast database 106.

D. Relationship Between Past and Future Databases

As evident by the description above, the weather history database 108 is a past database because it contains historical information. In contrast, the weather forecast database 106 is a future database because it contains information pertaining to predicted weather in the future.

Both databases contain information on a per period basis. Preferably, the increment of time represented by a period is the same in both databases. Also, the periods in both databases are synchronized. Suppose that the increment of time is set equal to one month in an administration setup process using administration workstation 120. In this example, if it is assumed that period P1 represents January, then in weather history database 108, period P1 represents January of a past year. Similarly, in the weather forecast database 106, period P1 will represent January of a future year.

E. Time Periods

As discussed above, data may be stored in the weather history database 108 using any time increment or period, including but not limited to daily, weekly, monthly, quarterly, etc. Similarly, weather forecast information for each location may be stored in the weather forecast database 106 on a daily basis, a weekly basis, a monthly basis, or a quarterly basis. Preferably, the time increment/period is the same in both databases 108 and 106. In practice, a system administrator will select the time increment(s)/period(s) during an administrator setup process using administration workstation 120 in order to meet the demands of traders using the plurality of workstations 110 and 114.

F. Financial Database

The financial database 104 of trading system 100 contains current financial data that is used by the trading server 102. The financial database 104 includes information relevant to calculating an investment's risk-free rate of return. Such information, as will be apparent to one skilled in the relevant art(s), may include but is not limited to one or more of the Discount Rate, the Prime Interest Rate, the 90-day Treasury Bill, the London Interbank Official Rate (LIBOR), the Eurodollar Rate, and the like. As will be explained below with reference to FIG. 4, the risk-free rate information within the financial database 104 is necessary for determining the cost-of-cash during the operation of the trading system 100. The financial database 104 may include additional financial information on an application specific basis.

III. The Black-Scholes Pricing Model

Before detailing the operation of the present invention, it is important to detail the specifics of the Black-Scholes pricing model. It is noted that, for illustrative purposes only, the invention is described with reference to the Black-Scholes pricing model. However, the invention is not limited to this embodiment. Instead, embodiments of the invention utilize variations of the Black-Scholes pricing model discussed herein. Also, other embodiments of the invention utilize pricing models other than the Black-Scholes model. The following description applies to such other embodiments of the invention. The Black-Scholes formula for determining the price of a call option, C, using the five parameters essential to the pricing of an option: (1) the strike price K; (2) the time to expiration t, (3) the underlying commodity price S; (4) the volatility of the commodity σ ("sigma"); and (5) the prevailing interest rate r, is shown in equation (3):

$$C = S * N(d_1) - Ke^{-(rt)} * N(d_2) \qquad 3)$$

As will be apparent to one skilled in the relevant art(s), e is the exponential function—the inverse of the natural logarithm ln—that is equal to, up to four significant decimal places, 2.7183. The variables $d_1$ and $d_2$ within equation (3) are expressed as shown in equations (4A) and (4B), respectively:

$$d_1 = \frac{\ln\left(\frac{S}{K}\right) + \left(r + \frac{\sigma^2}{2}\right)t}{\sigma\sqrt{t}} \quad \text{(4A)}$$

$$d_2 = d_1 - \sigma\sqrt{t} \quad \text{(4B)}$$

The function "N( )" is the standard normal distribution function, which, as is well known in the relevant art(s), may be accurately approximated for any value z using equation (5):

$$N(z) = 1 - \frac{1}{(\sqrt{2}*\pi)} * e^{-z^2/2} * (b1*k + b2*k^2 + b3*k^3) \quad \text{(5)}$$

Further, the variable k used in equation (5) is defined as shown in equation (6):

$$k = 1/(1+a*z) \quad \text{(6)}$$

The values a, b1, b2, b3 are constants equal to {a=0.33267; b1=0.4361836; b2=−0.1201676; and b3=0.937298}.

Having presented the Black-Scholes formula for a call option, equation (7) describes the expression for the price P of a put option:

$$P = C - S + Ke^{-(rt)} \quad \text{(7)}$$

Having presented the Black-Scholes pricing model, the operation of the present invention and its application to pricing weather-based financial instruments may now be explained. However, as indicated above, while the present invention is described in terms of adopting the Black-Scholes model to include weather considerations, it will be apparent to one skilled in the relevant art(s), that other pricing model may be so adopted.

IV. General System Operation

Figure 4:
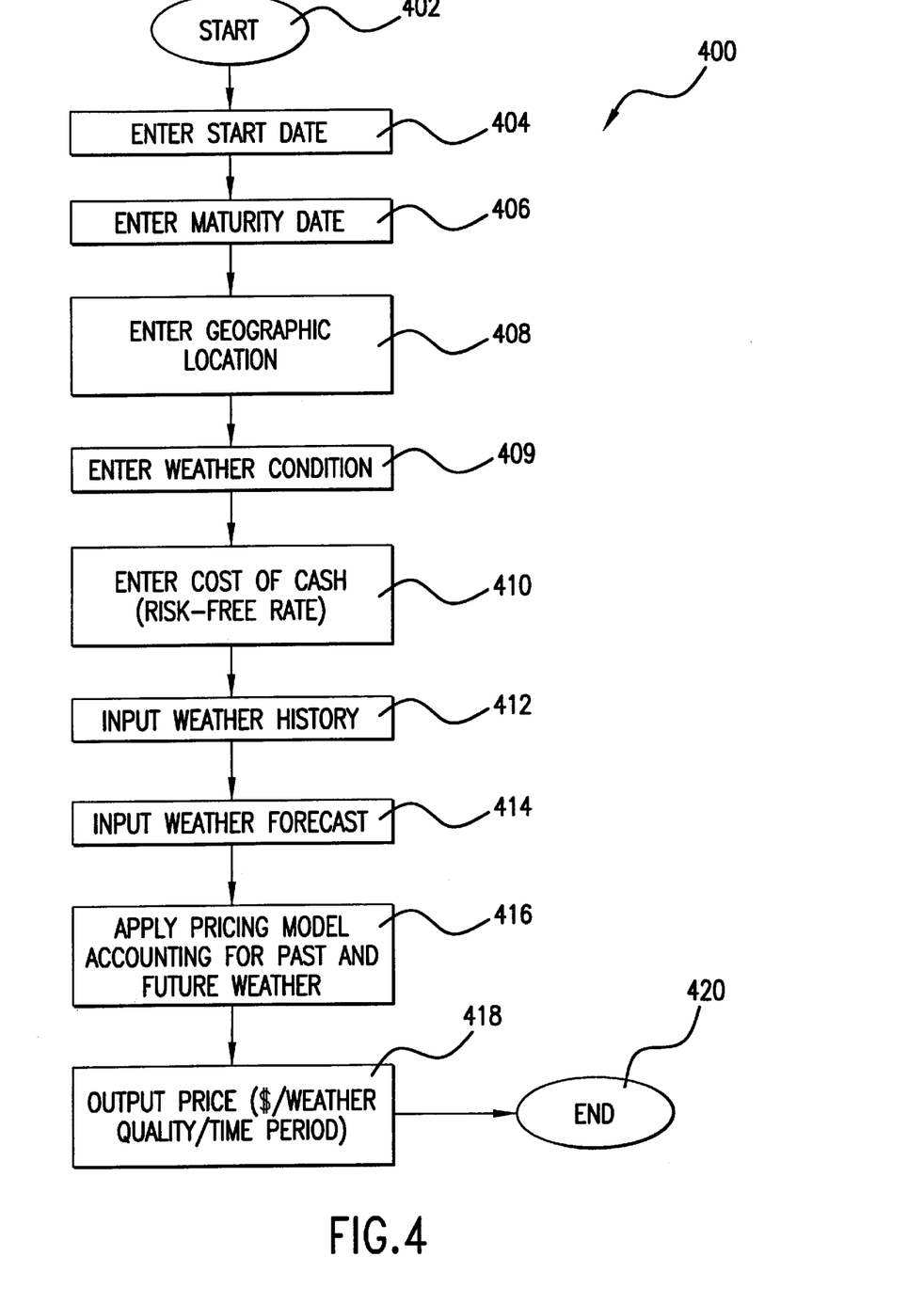
FIG. 4 is a flowchart representing the preferred operation of the present invention.

Referring to FIG. 4, a flowchart 400 representing the operation of trading system 100, according to an embodiment of the present invention, is shown. Flowchart 400 begins at step 402 with control passing immediately to step 404.

A. Inputs

In steps 404 and 406, the start date and the maturity date, respectively, of the contract are entered into the weather trader server 102 of trading system 100. In step 408, the geographic location (or region) which serves as the subject of the contract is entered. The geographic location can be a single location or multiple locations. That is, the geographic location may be a single MSA or a collection (i.e., "basket") which includes a plurality of different MSAs. In step 409, the weather condition or pattern which serves as the basis of the contract is entered (in some embodiments, multiple weather conditions or patterns can be entered). In an embodiment of the present invention, the weather condition or pattern may be—without limitation—HDDs, CDDs, precipitation, mean temperature, etc., or a combination thereof. Then, in step 410, the cost of cash is entered. The cost-of-cash (i.e., the risk-free rate) information may be read from the financial database 104 of the trading system 100, or may be obtained from another source, such as (without limitation) an on-line financial service.

Figure 5:
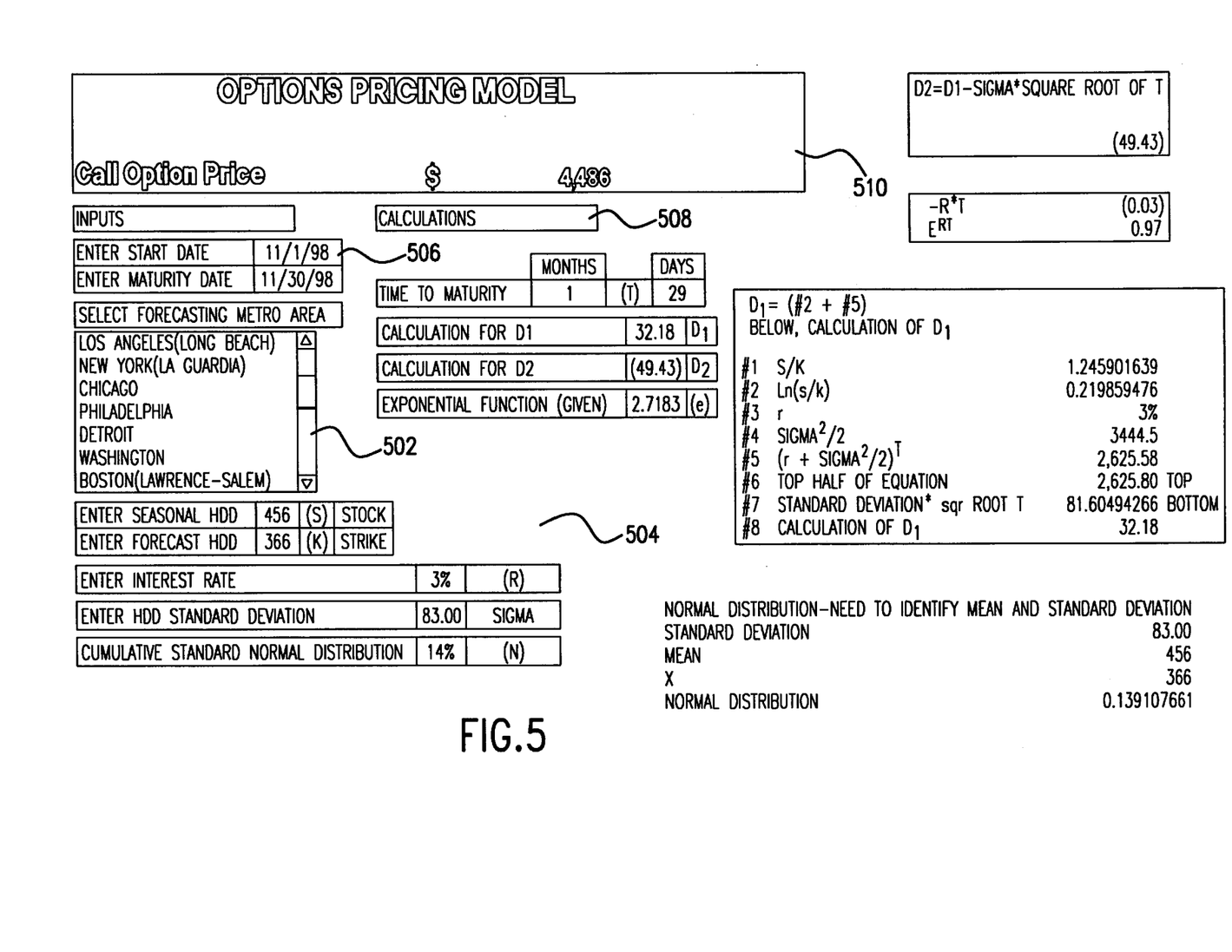
FIG. 5 is an exemplary graphical user interface screen for the trading system of the present invention.

The above information may be entered by a user using a graphical user interface (GUI) screen, such as that shown in FIG. 5, for example.

In an embodiment of the present invention, the user of system 100 may enter the time period (steps 404 and 406), the metro area(s) (step 408), and weather condition(s) (step 409), and the historical and forecast weather information, as well as financial information, will automatically be retrieved from the appropriate databases (see FIG. 1) to populate the GUI screen.

B. Processing and Output

In step 412, the weather history database 108 is read so that the trading server 102 has the correct information for processing. The information read from the weather history database 108 includes the past weather for a fixed past time period for the geographic location(s) entered in step 408. In a preferred embodiment of the present invention, the fixed past time period would be equal to thirty (30) years. The invention is not limited to this time period —other time periods could alternatively be used. That is, the trading server 102 would query the weather history database 108 (or obtain the information from some other source, such as a commercial service) for the last thirty year's weather history for the geographic location entered in step 408. As mentioned above, weather history database 108 contains the data necessary to provide the trading server 102 the particular weather condition or pattern which serves as the basis for the contract as entered in step 409.

In step 414, the weather forecast database 106 is read so that the trading server 102 has the correct information for processing. That is, the trading server 102 would query the weather forecast database 106 (or obtain the information from some other source, such as a commercial service) for the period represented by the start and maturity dates entered in steps 404 and 406, respectively. As mentioned above, weather forecast database 106, similar to weather history database 108, contains the data necessary to provide the trading server 102 with the particular weather condition which serves as the basis for the contract as entered in step 409. During step 414, the weather server 102 may identify the predicted weather pattern that occurs in the future time period specified by steps 404 and 406. Consider, for example, weather forecast database 106 shown in FIG. 3. As indicated by records 302 and 304, the predicted weather pattern in MSA100 in future period P1 is T1P1. Accordingly, in this example, the trading server 102 in step 414 identifies weather pattern T1P1 as occurring in the selected future time period P1 in the selected location.

After the completion of steps 402 to 414, the trading server 102 of trading system 100 may now calculate the price of a weather derivative (i.e., weather-based call option). Normally four parameters of equation (3), K, S, r, and t, can be figured with particularity However, the volatility of a commodity (e.g., a stock or any other underlying asset or security), σ, cannot. With this parameter, human judgment comes into play to quantify. There are traditionally two methods for measuring volatility—historical and implied. This is where weather must be considered.

As mentioned above, most models assume that, for example, last year's weather and its effects will repeat from year to year. Historical analysis has shown, however, that this assumption is true only 25% of the time. Thus, the present invention can make use of future weather database 106 (in conjunction with weather history database 108) to arrive at a more accurate volatility calculation, and thus a better option price.

In step 416, a pricing model (e.g., the Black-Scholes pricing model of equation (3), or some other well-known pricing model) which has been modified to take into account both past and future weather is applied. The present invention contemplates four weather-related modifications to the Black-Scholes pricing model of equation (3) (such modifications can also be applied to other pricing models). First, the strike price, K, is the forecasted (i.e., future) weather condition.

Second, because we are dealing with weather and not an underlying stock with a quoted (i.e., market) price, the underlying commodity price, S, is the historical weather condition measure for the geographic region for the time period between the start and maturity dates.

Third, the volatility σ, using the historical method, is the annualized standard deviation of the natural logarithm (ln) of the weather condition relatives as called for in the contract (and entered in step 409 (e.g., HDDs)). That is, in a preferred embodiment of the present invention where the weather history database 108 includes data for thirty years, the volatility will be an annualized standard deviation of the measure of the weather condition over the past thirty years.

Fourth, as a consequence of the modifications mentioned above, the standard normal distribution function calculation of equations (5) and (6) is also modified. To account for weather, $N(d_1)$ is first calculated and then $N(d_2)$ is set to the same value. This is done because many pricing models, including the Black-Scholes pricing model, are designed for commodities (i.e., stock) that fluctuate in price on a given day. That price may vary from minute to minute during active trading on an exchange (e.g., NYSE) and would be important in valuating an option for that commodity. However, because the present invention deals with weather as the underlying commodity, the selected weather condition (e.g., temperature) fluctuations for a given day are not as relevant considering weather-based or weather-impacted financial instruments deal with average weather measurements (see Table 1 and equations (1) and (2)).

In equations (8) and (9) below, the sum n+1 represents the number of historical weather condition observations (which is 30 in the preferred embodiment) calculated from querying the weather history database 108. Thus, $u_i$ is defined as the logarithm of the price S relative between two weather prices (i.e., historical weather condition measurements) $S_i$ and $S_{i-1}$ and is expressed by equation (8):

$$u_i = ln(s_i/s_{i+1}) \qquad (8)$$

Thus, historical volatility, σ, can be calculated using equation (9):

$$\sigma^2 = \sum_{i=1}^{n} (u_i - u)^2 \qquad (9)$$

In equation (9), u is the mean of all the (thirty) weather observations. Finally, σ may then be computed by taking the square root of σ.

In step 418, trading system 100 may now output the "future price of weather" (i.e., C for a call-type option weather derivative) for the weather-based financial transaction. That is, trading system 100 may publish a call option contract price for a particular period (i.e., between the start date and maturity date), for a particular geographic location (e.g., MSA), for a particular weather condition (e.g., HDDs calculated from temperature data located in databases 106 and 108 using equation (2)). The operation of trading system 100 is thus complete as indicated by step 420 of flowchart 400.

In an alternative embodiment, as will be apparent to one skilled in the relevant art(s) based on the teachings contained herein, trading server 102 of trading system 100 may operate in a manner where the volatility σ is outputted when given the cost of a weather contract C. Furthermore, the present invention contemplates an embodiment where standard inputs are entered into trading system 100 for given geographic location so that the a "weather index" may be published in the newspaper 116. That is, a "weather index" may be published in a newspaper 116 for a plurality of MSA's given an industry agreed upon set of inputs for a weather-based financial instruments. For example, the output of step 418 may be a "weather index" (similar to the Dow™ Industrials or S&P™ 500) for CDDs for future months for a particular MSA.

V. Detailed Example of System Operation

In an embodiment of the present invention, trading server 102 will provide a GUI (as shown in FIG. 5) for users, such as the in-house traders using the plurality of workstations 110, to enter inputs and receive the outputs as described in flowchart 400. Further, trading server 102 in conjunction with the web server 110 will also provide a GUI to the plurality of external users on the workstations 114 to enter inputs and receive the outputs as described in flowchart 400.

Still referring to FIG. 4, a detailed example of the operation of trading system 100, is presented in Table 2 below. Table 2 illustrates example numbers for each step of flowchart 400 presented in FIG. 4. In this example, as will be apparent to one skilled in the relevant art(s) based on the teachings contained herein, trading server 102 will use the temperature data stored in databases 106 and 108 in calculating the HDDs for steps 412 and 414, respectively, using equation (2).

A GUI screen 500 with the representative numbers in Table 2 is shown in FIG. 5. The GUI screen 500 includes a pull down menu 502 listing each MSA for which the weather history database 108 and weather forecast database 106 have available data and thus, trading system 100 may process a financial transaction for.

TABLE 2

| Step | Input(s)/Calculation(s) | Equation(s) |
|---|---|---|
| 404 | Start Date = 11/1/98 | |
| 406 | Maturity Date = 11/30/98 | |
| 408 | Metro Area = Washington, D.C. | |
| 409 | Weather Condition = HDDs | |
| 410 | Interest Rate = 3% | |
| 412 | Weather History (i.e., seasonal) = 456 HDDs | Equation (2) |
| 414 | Weather Forecast = 366 HDDs | Equation (2) |
| 416 | S = 456 | Inputs to |
| | K = 366 | Equation (3) |
| | t = 29 days = 29/30 months = 0.9667 | |
| | r = 3% | |
| | e = 2.71828 | |
| | σ = 83 | Equations (8) & (9) |
| | $d_1 = \dfrac{ln\left(\dfrac{S}{K}\right) + \left(r + \dfrac{\sigma^2}{2}\right)t}{\sigma\sqrt{t}}$ | Equation (4A) |
| | $d_1 = 32.18$ | |
| | $d_2 = d_1 - \sigma\sqrt{t} = -49.43$ | Equation (4B) |
| | $N(d_1) = 14\%$ | Equations (5) & (6) |
| | $N(d_2) = 14\%$ | |
| 418 | $C = S*N(d_1) - Ke^{-(rt)}*N(d_2) = \$4,486$ | Equation (3) |

The GUI screen 500 further includes a display 504 indicating the seasonal and forecasted weather condition (e.g., HDDs) for the geographic location highlighted in the pull down menu 502. The weather conditions shown in display 504 are calculated from the weather history database 108 and weather forecast data base 106, respectively, after the user has used input boxes 506 to enter the contact start and maturity dates, respectively. GUI Screen 500 also includes calculation boxes 508 which show the various components of equation 3. Upon trading system 100 calculating equation 3, the call option price is displayed in a box 510 within the GUI screen 500.

VI. Environment

Figure 6:
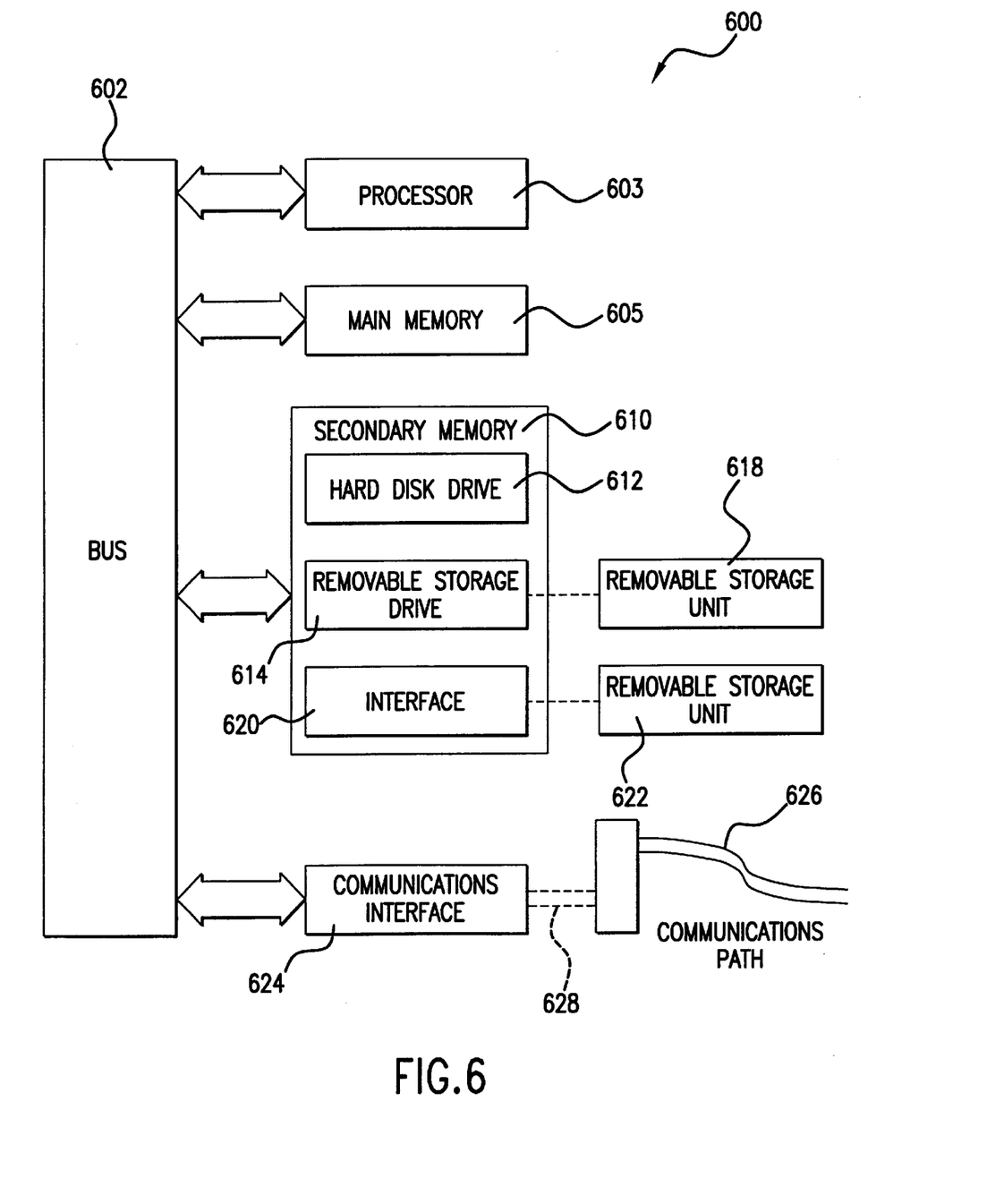
FIG. 6 is a block diagram of an exemplary computer system useful for implementing the present invention.

The present invention (i.e., trading system 100 or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 600 is shown in FIG. 6. The computer system 600 includes one or more processors, such as processor 603. The processor 604 is connected to a communication bus 602. Various software embodiments are described in terms of this exemplary computer system. After reading this description, it will be apparent to a person skilled in the relevant art how to implement the invention using other computer systems and/or computer architectures.

Computer system 600 also includes a main memory 605, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, a phone line, a cellular phone link, an RF link and other communications channels.

In this document, the term "computer program product" refers to removable storage units 618, 622, and signals 628. These computer program products are means for providing software to computer system 600. The invention is directed to such computer program products.

Computer programs (also called computer control logic) are stored in main memory 608, and/or secondary memory 610 and/or in computer program products. Computer programs may also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A computer implemented method for valuating a weather-based financial instrument, comprising the steps of:
   (1) receiving information representative of a start date and maturity date for the financial instrument;
   (2) receiving information representative of a geographic region to be covered by the financial instrument;
   (3) receiving information representative of a weather condition that the financial instrument will derive its value from;
   (4) receiving information representative of a risk-free rate;
   (5) receiving historical weather information, relating to said weather condition, for said geographic region during the period between said start date and said maturity date;
   (6) receiving future weather information, relating to said weather condition, for said geographic region during the period between said start date and said maturity date; and
   (7) obtaining a value of the financial instrument by applying a pricing model using said historical weather information, said future weather information, and said risk-free rate.

2. The method of claim 1, wherein said pricing model is the Black-Scholes pricing model.

3. The method of claim 2, wherein said weather condition is a heating degree-day.

4. The method of claim 2, wherein said weather condition is a cooling degree-day.

5. The method of claim 2, wherein said weather-based financial instrument is a call option contract.

6. The method of claim 2, wherein said weather-based financial instrument is a put option contract.

7. The method of claim 2, wherein said weather-based financial instrument is a futures contract.

8. A computer implemented method for valuating a financial instrument related to weather, comprising the steps of:

(1) obtaining historical weather information and predicted future weather information; and (2) obtaining the value of the financial instrument by applying a pricing model using at least said historical weather information and said predicted future weather information.

9. A computer implemented method for valuating a financial instrument related to weather, comprising the steps of:

(1) receiving information representative of an applicable period;

(2) receiving information representative of a geographic region;

(3) receiving information representative of an interest rate;

(4) receiving historical weather information for said geographic region during the applicable period;

(5) receiving future weather information for said geographic region during the applicable period; and (6) obtaining a value of the financial instrument from a pricing model using at least said historical weather information, said future weather information, and said interest rate.

10. A computer implemented method for determining the volatility of a weather-based financial instrument, comprising the steps of:

(1) receiving information representative of a start date and maturity date for the financial instrument;

(2) receiving information representative of a geographic region to be covered by the financial instrument;

(3) receiving information representative of a weather condition that the financial instrument will derive its value from;

(4) receiving information representative of a risk-free rate;

(5) receiving historical weather information, relating to said weather condition, for said geographic region during the period between said start date and said maturity date;

(6) receiving information representative of a cost of the financial instrument;

(7) receiving future weather information, relating to said weather condition, for said geographic region during the period between said start date and said maturity date; and (8) obtaining the volatility of the financial instrument from a pricing model using said historical weather information, said future weather information, said risk-free rate, and said cost.

11. A system for valuating a weather-based financial instrument, comprising:

a weather history database that stores historical weather information for at least one geographic location;

a weather forecast database that stores future weather information for at least said one geographic location;

at least one workstation that allows a user to specify inputs that affect the value of the financial instrument; and at least one trading server, responsive to said workstation and connected to said weather history database and said weather forecast database, that obtains a value of the financial instrument by applying a pricing model using said specified inputs from said user.

12. The system of claim 11, further comprising a financial database that stores risk-free rate information used by said trading server to valuate the financial instrument.

13. The system of claim 12, wherein said pricing model is the Black-Scholes pricing model.

14. A computer system for valuating a weather-based financial instrument, comprising:

means for receiving information representative of a start date and maturity date for the financial instrument;

means for receiving information representative of a geographic region to be covered by the financial instrument;

means for receiving information representative of a weather condition that the financial instrument will derive its value from;

means for receiving information representative of a risk-free rate;

means for receiving historical weather information, relating to said weather condition, for said geographic region during the period between said start date and said maturity date;

means for receiving future weather information, relating to said weather condition, for said geographic region during the period between said start date and said maturity date; and obtainimg a value of the financial instrument by applying a pricing model using said historical weather information, said future weather information, and said risk-free rate.

15. A computer program product comprising a computer usable medium having control logic stored therein for causing a computer to valuate weather-based financial instruments, said control logic comprising:

first computer readable program code means for causing the computer to receive a start date and maturity date for the financial instrument;

second computer readable program code means for causing the computer to receive a geographic region to be covered by the financial instrument;

third computer readable program code means for causing the computer to receive a weather condition that the financial instruments will derive its value from;

fourth computer readable program code means for causing the computer to receive a risk-free rate;

fifth computer readable program code means for causing the computer to access historical weather information, relating to said weather condition, for said geographic region during the period between said start date and said maturity date;

sixth computer readable program code means for causing the computer to access future weather information, relating to said weather condition, for said geographic region during the period between said start date and said maturity date; and seventh computer readable program code means for causing the computer to obtain a value of the financial instrument by applying a pricing model using said historical weather information, said future weather information, and said risk-free rate.

16. The computer program product of claim 15, wherein said pricing model is the Black-Scholes pricing model.

* * * * *

UNITED STATES PATENT AND TRADEMARK OFFICE
CERTIFICATE OF CORRECTION

PATENT NO.    : 6,418,417 B1
DATED         : July 9, 2002
INVENTOR(S)   : Corby et al.

It is certified that error appears in the above-identified patent and that said Letters Patent is hereby corrected as shown below:

<u>Title page,</u>
Item [56], References Cited, please insert the following citations:
-- WO 98/12658
   WO 98/22899 --

Signed and Sealed this

Eighteenth Day of February, 2003

JAMES E. ROGAN
*Director of the United States Patent and Trademark Office*